United States Patent
Dunwoody et al.

(10) Patent No.: US 6,752,974 B2
(45) Date of Patent: Jun. 22, 2004

(54) HALOCARBON ABATEMENT SYSTEM FOR A GLASS MANUFACTURING FACILITY

(75) Inventors: Steven A. Dunwoody, Castle Hayne, NC (US); Jeffrey E. Taylor, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 65 days.

(21) Appl. No.: 10/120,281

(22) Filed: Apr. 10, 2002

(65) Prior Publication Data

US 2003/0194367 A1 Oct. 16, 2003

(51) Int. Cl.⁷ .................................................. A62D 3/00
(52) U.S. Cl. ............................... 423/240 S; 423/240 R

(56) References Cited

U.S. PATENT DOCUMENTS 6,149,884 A    11/2000    Appriou et al. ............... 423/92

*Primary Examiner*—Stanley S. Silverman
*Assistant Examiner*—Edward M. Johnson
(74) *Attorney, Agent, or Firm*—Kevin M. Able; Timothy R. Krogh

(57) ABSTRACT

The invention relates to a method of treating a substantially gaseous halo-containing compound of an effluent of a glass manufacturing facility and a system for such method. The method includes the step of oxidizing the halo-containing compound to form a hydrogen and halo-containing compound. The method also includes the step of adsorbing a halogen of the hydrogen and halo-containing compound on a surface. The system includes at least one glass manufacturing apparatus which the operation of the apparatus in glass manufacturing generates an effluent which comprises a substantially gaseous halo-containing compound. The system also includes an oxidizer in fluid communication to receive the halo-containing compound and oxidize the compound to transform the halo-containing compound into a hydrogen and halo-containing compound. The system further includes a scrubber for receiving said hydrogen and halo-containing compound and absorbing the halogen from the hydrogen and halo-containing compound.

17 Claims, 1 Drawing Sheet

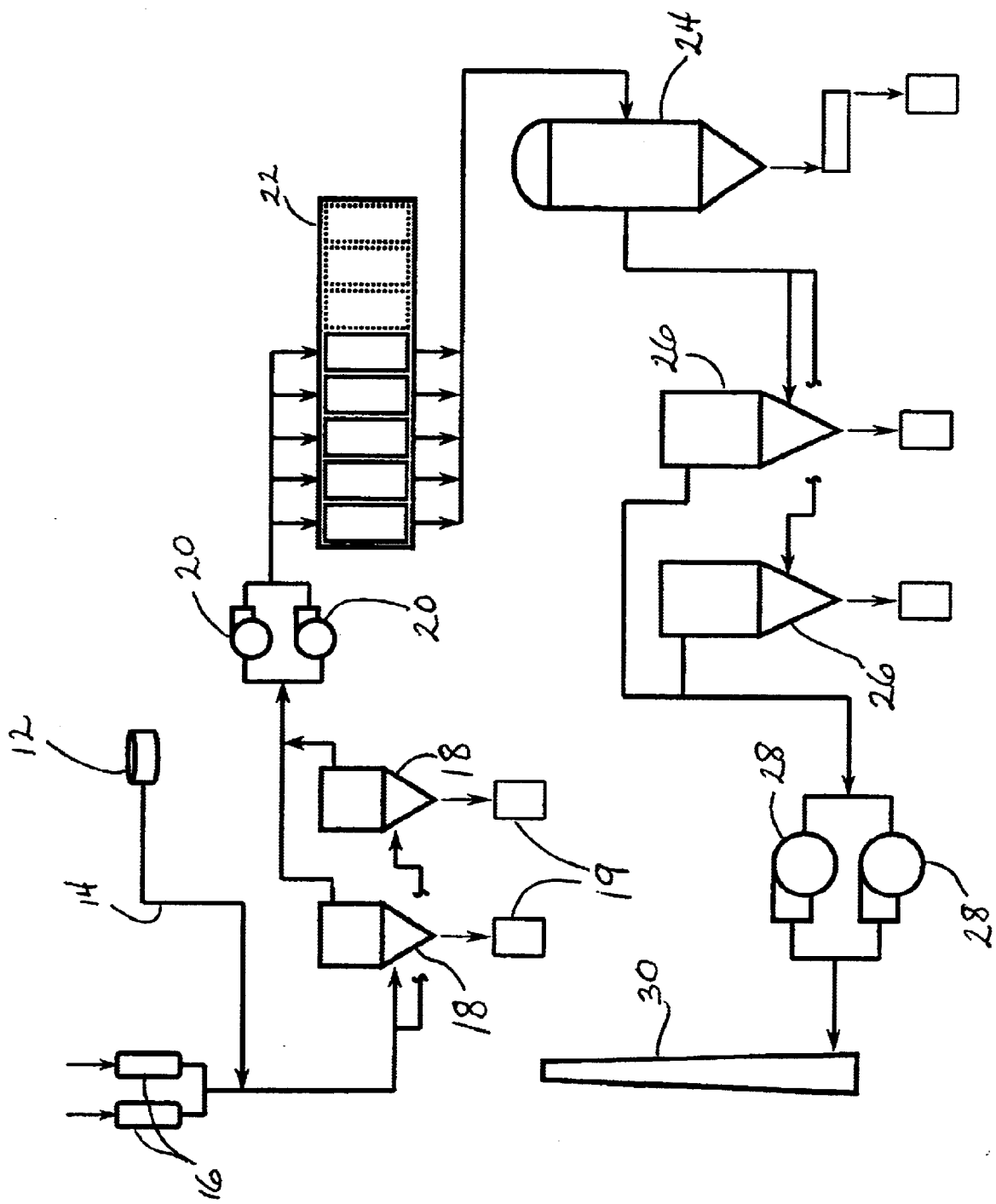

HALOCARBON ABATEMENT SYSTEM FOR A GLASS MANUFACTURING FACILITY

BACKGROUND OF THE INVENTION

1. Field of the Invention

The present invention relates generally to manufacturing optical fibers, and particularly to techniques for remediation of optical fiber manufacturing effluent material.

2. Technical Background

Optical fibers have acquired an increasingly important role in the field of communications, frequently replacing existing copper wires. This trend has had a significant impact in the local area networks (i.e., for fiber-to-home uses), which have seen a vast increase in the usage of optical fibers. Further increases in the use of optical fibers in local loop telephone and cable TV service are expected, as local fiber networks are established to deliver ever greater volumes of information in the form of data, audio, and video signals to residential and commercial users. In addition, use of optical fibers in home and commercial business environments for internal data, voice, and video communications has begun and is expected to increase.

As use of optical fiber increases so does the demand for optical fibers, which are able to offer improved or new properties as compared to fibers already in use. Efforts to produce such fibers have included producing a fiber doped with a halogen, e.g., fluorine, at specific radial locations in a silica glass matrix to depress the index of refraction relative to the index of refraction of pure silica to achieve desired optical properties. Such efforts result in a halogen containing effluent.

However, existing environmental laws regulate point source emissions of at least $SiO_2$ and some halogen containing compounds, e.g., fluorine containing compounds. Typical point source emissions include the regulation of air emissions, water emissions, or solid emissions. With respect to point source emissions, the allowable water point source emissions are very limiting, the regulated water point source emission may be as low as parts-per-million of a halogen (e.g., fluorine). Thus, systems that do not require water point source emissions, preferably systems that do not require water or air point source emissions, are desirable in a manufacturing environment.

Unfortunately, existing processes for abatement of a halogen containing effluent typically include a pretreatment or post treatment scrubbing of a hydrogen-halogen containing gas (e.g. HF) with an aqueous scrubber. These processes all lead to the formation of a halogen containing water point source emission. Also, subsequent processing of the halogen containing water is a timely and capital intensive project. Therefore, there is a need for a new method to abate halogen effluents from a glass manufacturing facility that does not include an aqueous or gaseous halogen point source emission.

SUMMARY OF THE INVENTION

One aspect of the invention is a method of treating a substantially gaseous halo-containing compound of an effluent of a glass manufacturing facility. A step of the inventive method includes oxidizing the halo-containing compound to form a hydrogen and halo-containing compound. A second step of the method comprises adsorbing a halogen of the hydrogen and halo-containing compound on a surface.

In another aspect, the present invention includes a system for treating a substantially gaseous halo-containing compound of an effluent of a glass manufacturing facility. The system includes at least one glass manufacturing apparatus which the operation of the apparatus, in glass manufacturing, generates an effluent which comprises a substantially gaseous halo-containing compound. The system further includes an oxidizer in fluid communication to receive the halo-containing compound and oxidizes the compound to transform the halo-containing compound into a hydrogen and halo-containing compound. The system also includes a scrubber for receiving the hydrogen and halo-containing compound and adsorbing the halogen from the hydrogen and halo-containing compound.

An advantage of the invention is that it is a new process for abating halogen containing compounds (e.g., $CF_4$ and HF) contained in the effluent of a fluoride doping process in the manufacturing of a glass product. Another advantage of the invention is that the method of the invention will not result in the production of an aqueous or airborne halogen point source emission. A further advantage of the invention is that invention is a substantially water free process. An additional advantage of the inventive process is that the halogen is converted into an inert dry-waste by-product.

Furthermore, advantages of the invention include the ability to construct an abatement system to include components and redundancies to enable rapid response to out of service conditions which minimize loss of ware and capability to start up the system in a short period of time. Minimize loss of ware is used above to mean at least a production run or runs that are in process when a component of the abatement system becomes inoperable are not required to be scrapped. A short period of time is used herein to mean that a back-up piece of equipment can be on-line and operating as part of the system in less than about 60 minutes, preferably less than about 45 minutes, and more preferably about 30 minutes or less. Also, the abatement system is designed to operate continuously while the sources of the halogen to be abated may be operated as a batch process.

Other advantages of the inventive process include: (1) the ability to process $CF_4$ and HF without an aqueous pretreatment; (2) the effluent of the inventive process is substantially free of $SiO_2$ particulate; (3) the remediation process can result in an inert solid waste by-product; (4) the entire remediation system may be operated under a vacuum to prevent exposure to personnel of non-benign compounds (e.g., HF) and equipment damage; (5) an efficient abatement system to remove high volumes of $CF_4$ and HF from the optical manufacturing process; (6) the inventive system also has the capabilities to provide particulate control in the effluent of the glass manufacturing facility; (7) a single oxidizer may used to oxidize the effluent from more than one furnace; and (8) the inventive process may be used to abate chlorinated, fluorinated, iodinated, or brominated derivatives of carbon and hydrocarbon materials.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

BRIEF DESCRIPTION OF THE DRAWINGS

The FIGURE is a schematic view of an embodiment of the present invention.

DETAILED DESCRIPTION OF THE PREFERRED EMBODIMENTS

Reference will now be made in detail to the present preferred embodiment(s) of the invention, an example of which is illustrated in the accompanying drawing. Whenever possible, the same reference numerals will be used throughout the drawing to refer to the same or like parts. One embodiment of the inventive abatement system of the present invention is shown in the FIGURE, and is designated generally throughout by the reference numeral 10.

The abatement system 10, as illustrated in the FIGURE includes at least one consolidation furnace 12, preferably a plurality of furnaces 12. Furnace 12 may be used to dry, dope, or sinter a soot preform into a dense glass preform. In the case of drying or doping a soot preform, the preform is exposed to a halogen containing atmosphere in furnace 12. A preferred halogen containing atmosphere for drying is a chlorine containing atmosphere such as $Cl_2$ and an inert compound e.g., He, $N_2$, Ar, etc. For additional background regarding drying a soot preform U.S. patent application Ser. No. 10/021,366 filed on or about Dec. 12, 2001 and any parent thereof are incorporated herein by reference in their entirety.

In the case of doping the soot preform, the preform may be doped with a halogen such as fluorine or bromine in furnace 12. In the case of doping the preform with fluorine, one method of doping the preform with fluorine includes exposing the preform to an atmosphere of $CF_4$ and He at a temperature of about 1000° C. or more, preferably about 1200° C., and more preferably about 1250° C. or more for a period of at least about 10 minutes or more.

In one doping operation, furnace 12 is purged routinely during the operation, preferably purged substantially continuously during the operation. The purging of furnace 12 assists in creating an effluent of furnace 12 including a halogen. For additional background regarding doping a preform with a halogen U.S. patent application Ser. No. 09/969,570 filed on or about Oct. 10, 2001 and any parent application thereof are incorporated herein by reference in their entirety.

A non-exhaustive example of halo-containing compounds which may be found in an effluent of furnace 12 comprise at least one from the group of HF, HCl, HBr, HI, $CI_4$, $CCl_4$, $SiCl_4$, carbonyl-chloride, $CBr_4$, $SiBr_4$, $SiI_4$, carbonyl-bromide, carbonyl-iodides, $CF_4$, $SiF_4$, carbonyl-fluorides, and mixtures thereof. Other components in the effluent may include $SiO_2$, $CO_2$, He, $N_2$, air, Ar, and carbonyl compounds. An example of concentrations of fluoride containing materials and silica in an effluent from furnace 12 are cited below in table 1.

TABLE 1

| Compound | Minimum volume % Unless indicated Otherwise | Maximum volume % Unless indicated Otherwise |
| --- | --- | --- |
| $CF_4$ | 0.12% | 1.80% |
| HF | 0.16% | 2.40% |
| $SiO_2$ | 0.25 lb/hr. | 3.7 lb/hr |
| Total Effluent | 105 scfm | 105 scfm |

Vendors are available to provide a chemical analysis of the effluent from furnace 12 or in a header 14. Two such vendors are Praxair of Danbury, Conn. and Enthalpy Analytical, Inc. from Raleigh, N.C. One test that may be used to determine the chemical make-up of the effluent in header 14 is FTIR.

Furnace 12 has a furnace exhaust header 14 for remediating the effluent of furnace 12. In the case of a plurality of furnaces 12, the furnace exhaust effluent may comprise a manifold system in which the exhaust effluent of each furnace ties into a main exhaust effluent line.

Exhaust header 14 is connected to at least one make-up air heater 16, preferably at least two heaters 16. Preferably, heater 16 does not raise the temperature of the matter in header 14 to more than about 250° F. It is further preferred that the temperature of the exhaust in header 14 is at least above 70° F., more preferably at least about 100° F., even more preferably at least about 125° F., and most preferably at least about 150° F.

It is also preferred that exhaust header 14 is designed to operate at a negative gauge pressure to provide sufficient pressure to remove the halogen containing effluent from a top of furnace 12. Negative gauge pressure is used herein mean a pressure that is less than about atmospheric pressure, e.g. below 1 atm (406.8 inches of water column). More preferably the negative pressure comprises about −6 inches of water column or less, and even more preferably about −6 to about −18 inches of water column.

It is also preferred that exhaust header 14 is sized such that $SiO_2$, in header 14 does not drop from the effluent and deposit on an inner surface of header 14. Furthermore, it is preferred that header 14 is sized to receive an exhaust effluent from a plurality of furnaces 12. In order to maximize the number of furnaces that supply effluent to header 14, the volumetric flowrate of the effluent from furnace 12 to header 14 should be minimized to extent practical. With respect to system 10, preferably each furnace 12 does not have an effluent flowrate of more than about 10 scfm, more preferably not more than about 7 scfm, and even more preferably not more than about 2 scfm. In an embodiment of the invention, the main line comprises an inner diameter of about 2.5 inches.

Preferably header 14 is either formed from a material of construction or lined with a lining that is resistant to halogen containing compounds such as HF, HCl, etc. One example of the material of construction for header 14 comprises fiber reinforced plastic fiberglass pipe (hereinafter "FRP") lined with a synthetic organic material which is impervious to HF. One such synthetic material is a Nexus veil. An FRP pipe lined with a Nexus veil is commercially available from Caroplast of Charlotte, N.C. Optionally, header 14 may be designed to be resistant to at least an environment that contains up to about 20,000 ppm of HF.

The aforementioned effluent from furnace 12 may be mixed ambient air that is supplied by heater 16. Moisture in the ambient air may react with any $SiCl_4$, $SiF_4$, or other silicon containing compound in the effluent to form silica.

The matter in header 14 is directed to an inlet dust collector 18 (A.K.A. baghouse). Preferably inlet dust collector 18 comprises one or more baghouses. In one embodiment of collector 18, collector 18 includes a plurality of polytetrafluoroethylene ("PTFE") filter bags having an expanded PTFE membrane. Preferably the membrane is bonded to the filter bag and preferably the filter bag comprises a woven filterbag. One source of the aforementioned filterbag comprises W. L. Gore of Wilmington, Del. Preferably, the filter bags are corrosion resistant at temperatures of at least about 450° F. and are also highly efficient bags.

Preferably baghouse 18 has an efficiency to remove at least about 85% of the particles of about 1 micron or larger, more preferably about submicron size particles or greater are removed, from the effluent having a flow rate of about 105 scfm, more preferably the efficiency is about 90% or more, and most preferred about 95% or more. A preferred air to cloth ratio of the filter bags is about 0.8 ft/min or less. A preferred grain loading rate is at least about 0.27 grains/ft$^3$, more preferably about 3.7 grains/ft$^3$ or more, and most preferably about 4.0 grains/ft$^3$. Preferably, the baghouse will remove particulate matter of the at least about 1 micron or larger from the effluent, more preferably particulate matter of less than about 1 micron (A.K.A. submicron) or larger.

Preferable particulates that may be removed from the effluent include $SiO_2$ particles. One apparatus that may be used to remove particulate from the filterbag includes a pair of reverse pulsejet dust collectors. Preferably, the pulsejet dust collectors are carbon steel with an epoxy Novalac coating. The pulsejet with the epoxy coating is available from Fisher-Klostermann of Louisville, Ky. The pulsejet dust collectors have a removal efficiency of at least about 85% by weight of the matter on the filter bag, preferably at least about 90%, and more preferably at least about 95%. A pressure drop across the pulsejet is at least about 0.1" of water column, more preferably no more than about 6" of water column, and most preferably about 2" of water column. The particulate removed from the filterbags may be collected in one of drums 19.

Preferably collector 18 has at least one wall heater to maintain the temperature of the walls of collector 18 above the dewpoint of the effluent, about 70° F. A function of the wall heater is to eliminate cold spots on an internal surface of a wall of collector 18. A cold spot is used herein to define at least a location on the wall of collector 18 with an internal surface at a temperature which condensation would form on the wall at the location. It is also preferred that dust collector 18 may be purged with air, especially heated air, to remove material prior to any maintenance operation of collector 18. Optionally, collector 18 may include one or more broken bag detectors. For additional background regarding collector 18, U.S. patent application Ser. No. 09/555,943 filed on or about Dec. 29, 1998 and any parent thereof is incorporated herein by reference in their entirety.

System 10 further includes at least one inlet blower 20, preferably a plurality of inlet blowers. One function of inlet blower 20 is to provide the proper air flow such that system 10 from furnace 12 to blower 20 is operated at a negative gauge pressure. Material of construction of inlet blower 20 is preferably resistant to HF. Preferably, blower 20 has a variable speed-control. Preferably, blower 20 assists in maintaining system 10 at a predetermined negative pressure. The pressure drop across the blower comprises about 100" of water column or less, preferably about 85" of water column of less, and more preferably about 83" of water column or less.

System 10 additionally includes an oxidizer 22, preferably a thermal oxidizer. Preferred sources of thermal energy include a laser, plasma, combustion, etc. Preferably oxidizer 22 is operated at a temperature and flow rate to convert substantially all of halogen containing compounds to a compound containing hydrogen and a halogen such as, but not limited to, at least one of the following: HF, HCl, HBr, HI, HAt, or mixtures thereof. Preferably, oxidizer 22 is operated at a temperature such that halogenated carbon compounds are not formed as result of the oxidation. An example of a preferred thermal oxidizer is manufactured by BOC Edwards and is commercially available through Alzeta Corporation of Santa Clara Calif. such as Edge QR (8)-GI17.

In one embodiment of oxidizer 22, $CF_4$ in the effluent gas is thermally converted into HF by reacting $CF_4$ with $CH_4$ at a temperature of at least about 1500° F., more preferably at least about 2000° F., even more preferably at least about 2500° F., and most preferably at least about 2800° F. An example of a preferred oxidation temperature is at least about 3000° F. Suitable fuels for oxidizer 22 include hydrocarbon fuels, such as methane, propane, ethane, natural gas, etc.

Preferably oxidizer 22 coverts more than about 90%, by volume, of the $CF_4$ in the entering effluent to HF, more preferably about 95% or more. It is also preferred that the incoming stream to oxidizer 22 is substantially particle free, meaning having substantially no particles of about 1 micron size or larger.

Preferably a minimum amount of vapor matter is injected into oxidizer 22 at substantially all times. More preferably, the flowrate of matter into oxidizer 22 remains substantially within a predetermined range, and most preferably remains substantially constant. In one embodiment of oxidizer 22, the oxidizer has about 5 modules and each module is able to oxidized about 16.2 scfm of effluent gas. Thus it is preferred that the flowrate of material into oxidizer 22 is at least about 16.2 scfm. If the flowrate of effluent matter into oxidizer 22 in less than about 16.2 scfm, make-up air can be used to increase the flowrate of matter into oxidizer 22 to a rate of about 16.2 scfm. It is also preferred that substantially all of oxidizer 22 is operated under a negative gauge pressure.

Oxygen is supplied to oxidizer 22 to convert the $CF_4$ at the aforementioned temperatures. The temperatures in the thermal oxidizer sections of oxidizer 22 are achieved by the combustion of natural gas on an inner surface of a porous cylindrical furnace element in oxidizer 22 and the combustion of a mixture of effluent gas and natural gas at a point of injection into oxidizer 22.

It is preferred that oxidizer 22 provides operational flexibility such that oxidizer 22 is capable to process a high volume effluent stream, provides a fast response to out of service events, and requires the use of standard parts. Examples of what is considered a high volume effluent stream for a glass manufacturing facility comprises at least about 75 scfm, preferably at least about 100 scfm, and more preferably at least about 125 scfm. Fast response is used above to mean less than about one hour, more preferably less than about 45 minutes, and most preferably less than about 30 minutes. It is further preferred that oxidizer 22 may be routinely operated to oxidize a compound such as $CF_4$. Preferably, oxidizer 22 does not have a water scrubbing system on an outlet of oxidizer 22.

The operation of oxidizer 22 may result in the formation of water vapor. However, it preferred that oxidizer 22 is maintained at a temperature such that the water vapor in the effluent, or formed in oxidizer 22, does not condense. Preferably, any effluent stream in oxidizer 22 is maintained about the dew point for the stream.

Optionally, a plenum may be added to system 10. A preferred location of the plenum is immediately adjacent oxidizer 22. A function of the plenum is to mix oxidizer 22 effluent material with air to reduce the temperature of the effluent material to a temperature of less than about 570° F., more preferably about 500° F. or less, and most preferably less than 450° F. It is preferred that the temperature of oxidizer 22 effluent comprises at least about 300° F. The flow rate of air into the plenum is determined by the amount of cooling necessary to cool the effluent gas exiting oxidizer 22 to a temperature within the aforementioned preferred temperature ranges. In one embodiment of the plenum, the mixing of air and the oxidizer effluent occurs by oxidizer 22 effluent passing through a perforated cylinder in the plenum. The volumetric flowrate of air that may be used to cool the oxidizer effluent may result in an air flowrate of at least about 2900 acfm, preferably at least about 8000 acfm, and most preferably at least about 9000 to about 10000 acfm, once the heat exchange between the effluent and the air has taken place.

The oxidized effluent is preferably feed into a substantially dry scrubber 24. Preferably the effluent that enters scrubber 24 is substantially free of condensed water. However, the incoming stream may include water in a vapor form. Preferably, the incoming stream is maintained at a temperature above the dew point of the stream. A standard that may be used to determine what is the relevant dew point for the water vapor in the incoming stream is at least about 105° F. and at least about 100% Rh. It is also preferred that the temperature of the effluent entering scrubber 24 comprises at least about 300° F. A below mentioned scrubber may operate at temperatures as high as about 570° F., however, if a dust collector is operated downstream from scrubber 24, the use temperature of scrubber 24 should not be so high such that incoming stream to the downstream collector will exceed the maximum use temperature of the downstream collector. It is preferred that scrubber 24 includes a scrubbing media that is capable of reacting with the hydrogen and halogen containing compound in the exit stream from oxidizer 22. A non-exhaustive list of hydrogen and halogen containing compounds that may react with the scrubbing media include HF, HCl, HBr, HI, HAt, and mixtures thereof. Preferably, the waste by-product of scrubber 24 comprises a substantially inert solid material.

Examples of suitable scrubbing media include hydrated lime, calcium such as calcium carbonate, and other members of groups IA and IIA of the periodic table of elements (Li, Na, K, Rb, Cs, Fr, Be, Mg, Sr, Ba, and Ra) and mixtures thereof. Preferably, the scrubbing media will react quickly with the hydrogen and halogen containing compound in a reaction which substantially removes the halogen from the effluent stream exiting scrubber 24. An example of one reaction of the effluent and the scrubbing media is shown below:

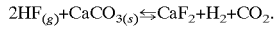
$$2HF_{(g)} + CaCO_{3(s)} \leftrightarrows CaF_2 + H_2 + CO_2.$$

As shown in the above chemical reaction, one function of scrubber 24 is to remove HF generated in oxidizer 22, as well as any other HF in the stream entering scrubber 24. It is preferred that the HF cascades through the scrubbing media inside scrubber 24. Preferably, the scrubbing media has a diameter size of at least about 2 mm, more preferably at least about 4–6 mm.

Scrubber 24 may also include a drum peeler to remove the halogen containing compound formed on the scrubbing media. For example, if the scrubbing media is $CaCO_3$ and the halogen is F, the drum peeler would remove the $CaF_2$ on the surface of the scrubbing media. Preferably, the $CaF_2$ is just one example of an inert solid by-product that may be generated to remove a halogen from the effluent stream. It is preferred that the inert solid by-product is in compliance with local solid waste management regulations for the disposal of a solid material. An example of one such regulation is 15A NCAC 13b for the state of North Carolina.

Scrubber 24 may also include a recycling element, such that the scrubbing media is circulated through scrubber 24 and the drum peeler. The drum peeler may be an integral part of the recycling element or attached to the recycling element. In one embodiment, the recycling element comprises a screw feed element to move material into the drum peeler. The peeled scrubbing media is transported over a screen type conveyor system, such that scrubbing media below a predetermined size and the solid inert by-product are disposed of through the screen and the media above the predetermined size are recycled. A pneumatic blower may be used to move the media back into scrubber 24.

Some functions of the recycling element may be described as (1) to move the used scrubbing media from the scrubbing portion of scrubber 24 and to the drum peeler; and (2) to add regenerated scrubbing media to an entry port of scrubber 24, e.g., a top of scrubber 24. One example of a source of a suitable scrubber 24 comprises Hellmich GmbH, such as scrubber FKA-210/500/CT.

Preferably scrubber 24 has an efficiency of at least about 85% removal, by volume, of HF from the incoming effluent. More preferably, scrubber 24 may remove 90% of HF at a load rate of about 1700 mg HF/Nm³ of effluent processed. Additionally it is preferred that the scrubber is operated as a delta P of 0.3" to about 2 3/16" of water column, more preferably about 0.5" to about 2" of water column. Scrubber 24 is sized to be able to treat an incoming effluent stream at a rate of at least about 2900 acfm, more preferably at least about 9000–10000 acfm. It is additionally preferred that scrubber 24 is able to withstand a deep vacuum, e.g., a negative gauge pressure of about −40 inches of water column.

In one embodiment of scrubber 24, scrubber 24 includes a storage silo on a top portion of scrubber 24. Scrubber 24 may also include a screw feeder at a bottom of scrubber 24 to feed used scrubbing media into the drum peeler. A pneumatic conveyor may be included in scrubber 24 to recycle the scrubbing media from the drum peeler to the top of scrubber 24 or to introduce fresh scrubbing media into scrubber 24.

As shown, system 10 includes an outlet dust collector 26 (A.K.A. baghouse) to remove particulate matter from the effluent stream prior to the effluent entering an exhaust stack 30. Preferably, collector 26 is similar to collector 18. However, collector 26 is sized to be able to abate a particulate stream at least 1 order of magnitude larger than that of collector 18. Preferably, collector 26 is sized to abate incoming effluent stream of at least about 9000–10000 cfm. Preferably the exhaust of collector 26 is substantially particulate free. As source of a suitable collector 26 comprises Industrial Accessory Corporation of Kansas City, Mo. Preferably, collector 26 comprises similar filterbags as collector 18. A preferred grain loading rate of collector 26 comprises no more than about 0.46 grains/ft³. An air to cloth ratio for collector 26 comprises no more than about 0.45 ft/min.

Furthermore, system 10 includes an outlet ID fan 28, preferably more than one outlet fan 28. One function of ID Fan 28 is to provide the proper air flow such that system 10 from inlet blower 20 to ID Fan 28 is operated at a negative gauge pressure. The ID fan is sized to move 8600 acfm of air. It is preferred that blower 20 and fan 28 are operated to maintain a negative gauge pressure in system 10, such that ambient air would leak into system 10 instead of a halogen containing compound leaking from system 10. ID Fans 28 has an inlet box damper control. The pressure drop across the ID Fan comprises about 34" of water column or less, preferably about 25" of water column or less, and more preferably about 20" of water column or less. Optionally, at least the interior components of ID fan 28, which come in contact with the effluent, are coated with a corrosion resistant coating. An example of an ID Fan is supplied by Howden Buffalo, Inc of Buffalo, N.Y. Also, system 10 includes at least one exhaust stack 30 to vent the abated effluent of furnace 12 from the glass manufacturing facility. The exhaust stack 30 is built to the ASME specification STS-1-1992. Preferably, stack 30 is designed and operated at a temperature above the dew point of the matter exhausted in stack 30 such that the matter does not condense and deposit on an internal surface of the stack 30.

Optionally, system 10 may include one or more halogen monitors, such as HF monitors. The monitors should be placed at locations where it is desirable to ensure that there is an acceptable level of a halogen in the atmosphere, such as near a fume hood. The detector should also be placed at a location that does not exceed the maximum use temperature for the detector. With respect to a HF detector, preferably the detector is located in an area with a maximum temperature of about less 131° F. Preferably, the detection limit is set at an exposure to HF at a level of about 0 to about 10 ppm. The personal exposure limit to HF is a time-weighted average of about 3 ppm over an 8 hour exposure period.

In accordance with the invention, the present invention includes a method of treating a substantially gaseous halo-containing compound of an effluent of a glass manufacturing facility. The method includes a first step of oxidizing the halo-containing compound to form a hydrogen and halo-containing compound. Halo-containing is used herein to mean a compound containing a halogen. A non-exhaustive list of hydrogen and halo-containing compounds is HCl, HBr, HF, and mixtures thereof. Preferably, the oxidizing step comprises a substantially non-aqueous process. Optionally, it is preferred that prior to the oxidizing step, the effluent is filtered such that the effluent comprises a substantially soot-free stream. Soot-free is used herein to mean substantially free of particles of about 1 micron or larger, more preferably submicron particulate or larger.

The method also includes the step of adsorbing a halogen of the hydrogen and halo-containing compound on a surface. Optionally, it is preferred that prior to the adsorbing step the effluent comprises a substantially soot-free stream. Preferably the surface is a surface of the aforementioned scrubbing media. It is preferred that the scrubbing media comprise a compound capable of reacting with the hydrogen and halo-containing compound. Preferentially the reaction between the scrubbing media and the hydrogen-halogen containing compounds occurs in less than about 1 minute, more preferably less than about 30 seconds, and even more preferably less than about 15 seconds.

In an embodiment of the inventive method, adsorbing comprises scrubbing the hydrogen and halo-containing compound. Preferably the scrubbing comprises a substantially non-aqueous process. In an embodiment of the invention, the scrubbing comprises reacting a calcium carbonate with the hydrogen and halo-containing compound.

Optionally, the method may include filtering the effluent through a baghouse. It is preferred that the baghouse comprises at least one filter and that the filter comprises PTFE filter bag and a PTFE membrane. The filtering step comprises removing at least particles of about 1 micron and greater, more preferably submicron or greater. Preferably, the filtering is operated for system 10 to be in compliance with 15A NCAC 2D.0515. The aforementioned regulations are incorporated herein by reference. The method may also include maintaining a temperature in the baghouse to no more than about 450° F. The inventive method may also include maintaining the temperature of the effluent prior to the adsorbing step to a temperature of at least about 300° F., but, not more than about 570° F. The aforementioned filtering may occur prior to the oxidizing step, after the adsorbing step, or both.

Another optional step includes drawing the effluent under vacuum for at least a portion of the abating of the halogen. More preferably, substantially all of system 10 operates under a vacuum. Vacuum herein may also be referred to as a negative gauge pressure, a pressure below atmospheric pressure, or a pressure that would inhibit flow of HF or other halogen containing compound out of system 10. A further optional step comprises the step of monitoring a concentration of the hydrogen and halo-containing compound outside of system 10. Benefits of monitoring the environment outside of system 10 include ensuring personnel safety. In one embodiment of the above method, a source of the effluent comprises at least a furnace, preferably more than one furnace, more preferably, the furnace comprises consolidation furnace 12.

System 10 may be incorporated into the manufacturing of glass products such as optical fibers, e.g., high data rate fibers, specialty optical fibers, and photonics products, e.g., Vascade S 1000 or Vascade R 1000 both available from Corning Incorporated of Corning, N.Y.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A method of treating a substantially gaseous halo-containing compound of an effluent of a glass manufacturing facility, said method comprising:

oxidizing the halo-containing compound to form a hydrogen and halo-containing compound;

adsorbing a halogen of the hydrogen and halo-containing compound on a surface; and filtering said effluent through a baghouse, wherein said baghouse comprises at least one filter, said filter comprising a PTFE filter bag and a PTFE membrane.

2. The method according to claim 1 wherein said adsorbing comprises scrubbing the hydrogen and halo-containing compound.

3. The method according to claim 2 wherein said scrubbing comprises reacting a compound having at least one element from groups IA or IIA of the periodic table of elements with said hydrogen and halo-containing compound.

4. The method according to claim 2 wherein said scrubbing comprises a substantially non-aqueous process.

5. The method of claim 1 wherein said surface comprises a compound capable of reacting with said hydrogen and halo-containing compound.

6. The method according to claim 1 wherein said filtering comprises removing at least particles of about 1 micron and greater.

7. The method of claim 1 further comprising maintaining a temperature in said baghouse at no more than about 450° F.

8. The method of claim 1 further comprising maintaining the temperature of the effluent at least about 70° F.

9. The method of according to claim 1 further comprising drawing the effluent under vacuum.

10. The method according to claim 1 wherein a source of said effluent comprises at least one furnace.

11. The method according to claim 1 wherein said effluent comprises a substantially particulate free stream prior to said oxidizing step.

12. The method according to claim 1 wherein said effluent comprises a substantially particulate free stream prior to said adsorbing step.

13. The method according to claim 1 wherein said halo-containing compound includes at least one from the group of $F_2$, $I_2$, $Cl_2$, $Br_2$, $CCl_4$, $SiCl_4$, $CI_4$, $SiI_4$, carbonyl-chlorides, $CBr_4$, $SiBr_4$, carbonyl-bromides, $CF_4$, $SiF_4$, carbonyl-fluorides, carbonyl-iodides, and mixtures thereof.

14. The method according to claim 1 wherein said hydrogen and halo-containing compound includes at least one from the group of HCl, HI, HBr, HF, Hat, and mixtures thereof.

15. The method according to claim 1 wherein said oxidizing comprises a substantially non-aqueous process.

16. The method according to claim 10 further comprising an exhaust manifold such that the effluent of each furnace have a common main conduit.

17. The method according to claim 1 further comprising filtering said effluent after said adsorbing step.

* * * * *

UNITED STATES PATENT AND TRADEMARK OFFICE
CERTIFICATE OF CORRECTION

PATENT NO. : 6,752,974 B2
DATED : June 22, 2004
INVENTOR(S) : Steven Akin Dunwoody et al.

It is certified that error appears in the above-identified patent and that said Letters Patent is hereby corrected as shown below:

Title page,
Item [56], References Cited, U.S. PATENT DOCUMENTS, please add the following:
-- 5,955,037   9/1999    Holst et al.    422/171
5,651,917    07/1997   Bridges et al.  252/186.41
2002/0103075 08-2002   Tokura et al.   502/171
2003/0049182 03-2003   Hertzler et al. 422/168
5,534,148    07-1996   Suzuki et al.   210/605 --.

Signed and Sealed this

Eighth Day of November, 2005

JON W. DUDAS
*Director of the United States Patent and Trademark Office*